United States Patent Office 2,849,411
Patented Aug. 26, 1958

2,849,411

STABILIZATION OF BASIC CONDENSATION PRODUCTS OF EPICHLOROHYDRIN

Wolfgang Lehmann and Otto Bayer, Leverkusen-Bayerwerk, Germany, assignors to Farbenfabriken Bayer Aktiengesellschaft, Leverkusen, Germany, a corporation of Germany No Drawing. Application November 19, 1953
Serial No. 393,232

Claims priority, application Germany November 19, 1952

1 Claim. (Cl. 260—29.2)

This invention relates to new condensation products, especially to high molecular weight, water-soluble basic condensation products containing reactive epoxy groups in the molecule. It further relates to a process of producing these condensation products.

It is known to react epichlorohydrin and ammonia, amines or polyamines. In French Patent 771,836 there is described the reaction of epichlorohydrin with ammonia, amines, for instance ethylenediamine, to form water-soluble condensation products which do not give up their solubility in water or alcohol after completely dehydrating. As set forth in German Patent 743,563 these products are useful to improve the fastness properties of dyeings, which are produced on cellulose fibers with substantive dyestuffs, against treatment with non-alkaline media. Furthermore, the United States Patents 2,469,683 and 2,515,142 describe the reaction of epichlorohydrin with di- or polyamines in concentrated aqueous solutions at a strongly alkaline pH; this reaction yields strongly cross-linked, insoluble products which are useful as ion exchanger.

In German Patent 731,030 there are described products derived from di- or polyamines and epichlorohydrin. These compounds possess self-linking properties and are converted immediately under suitable conditions—from a low viscous, not very high molecular weight state, in which they are obtained—into solid water-insoluble compounds of high molecular weight without highly viscous, high molecular weight, still water-soluble intermediate stages forming or without being capable of isolating such intermediate stages. These products are stable due to their relatively low polymerization degree; no stabilizers need be incorporated therewith to prevent a spontaneous self-linking reaction and the products may be produced and employed in concentrated solutions even in a solid state.

In accordance with the invention we have surprisingly found that high molecular weight, highly viscous, water-soluble basic condensation products containing free epoxy groups in the molecule can be obtained from epichlorohydrin and di- or polyamines. These products show very valuable properties and are distinguished from the previously known products. The reaction conditions for producing the condensation products, for instance the molecular proportion of the reactants, pH value, concentration and temperature are to be applied so that, on the one hand, the products obtained possess a high molecular weight and high viscosity and, on the other hand, are soluble in water.

Instead of epichlorohydrin, substitution products or homologues thereof may be used as starting materials. Furthermore, dichlorohydrin and an appropriate amount of alkali may be employed instead of epichlorohydrin. Especially suitable di- or polyamines are compounds in which at least one primary or secondary amino group is separated from an adjacent primary or secondary amino group by at least three atoms, for instance tetramethylenediamine, hexamethylenediamine, dipropylenetriamine, γ,γ'-diaminopropylmethylamine, γ,γ'-diaminodipropylether, diaminopropyltetramethylenediamine, bis - (γ-aminopropyl)-piperazine, N-(1,6-hexanediamine)-3-pyrrolidone of the formula

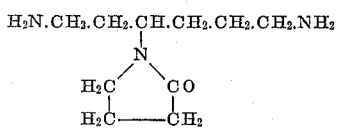

or polyethylene imines.

The reaction may be carried out in an aqueous medium, in organic solvents or in mixtures of water and organic solvents, for instance mixtures of water and acetone, methanol, ethanol, propanol, dimethylformamide or dioxane. The concentration of the reaction mixture shall not exceed about 40% and shall amount to at least 5%. The increase of the concentration beyond 40% promotes the tendency to form cross-linked insoluble products.

The temperatures to be applied in the reaction depend upon the choice of the starting products. In general, temperatures of 40–70° C. suffice to guarantee a smooth reaction. It is of advantage to carry out the reaction of certain diamines at temperatures of 80–100° C.

An essential feature in the production of the new condensation products is the choice and control of the pH value. It has proved to be most advantageous to start the reaction in a strongly alkaline medium, say at pH 10 or even at pH 11, and to reduce the hydrogen ion concentration progressively as the viscosity of the reaction mixture increases. In general, the hydrogen ion concentration is adjusted to the proper value without any addition if the quantitative proportion of the two reactants is properly chosen. If necessary, the alkalinity must be reduced so that the final pH value ranges between about 7 and 9.5. The reaction may be interrupted at any time by addition of an acid, for instance a mineral acid; by this step the condensation products are simultaneously stabilized.

The ratio of epichlorohydrin and di- or polyamine shall amount to preferably about 0.7–1.3 mols of epichlorohydrin per one mol of the basic nitrogen group. The use of a lesser quantity than 0.7 mol of epichlorohydrin involves the danger of a premature cross-linking reaction under the reaction conditions. The danger may be avoided by eliminating part of the basic groups by salt formation, which is accomplished by addition of appropriate quantities of acids, for instance mineral acids. The use of more than 1.3 mols of epichlorohydrin leads to products the viscosity of which is too low. Also in this case, however, the reaction gives valuable condensation products of high viscosity if care is taken that the reaction mixture is maintained at a pH value of 7–9.7; this is reached by the continuous addition of alkaline, ammonia or monoamines. This modification allows of replacing part of the valuable di- or polyamines by cheaper starting products.

According to another embodiment of the invention the reaction is carried out in steps, i. e., epichlorohydrin and a di- or polyamine are added alternately. Furthermore, it is possible to control the reaction in any desired direction by appropriately varying the concentration and temperature.

It could not be cleared up so far whether the reaction taking place between epichlorohydrin and di- or polyamines proceeds in such a manner that the chlorine of epichlorohydrin reacts first with the amino group while the epoxy group is preserved, or whether the epoxy group reacts first and an epoxy ring is newly formed from the resulting chlorohydrin by splitting off hydrogen chloride or whether these reactions proceed concurrently. The herein described invention, however, is by no means affected by these considerations concerning the reaction mechanism since products with the above said properties are obtained in either case.

The new condensation products are obtained in the form of highly viscous solutions which are miscible with water in every proportion. These solutions can be stabilized by addition of acids, for instance mineral acids, and are stable at pH values of 3 and lower for long periods of time. The stability of the solutions decreases with increasing pH values and with increasing concentrations. Entirely dehydrated products are cross-linked and insoluble.

In weakly alkaline media and at moderate temperatures the highly viscous concentration products can easily be converted to quaternary compounds without cross-linking reactions taking place. By increasing the concentration also the quaternary compounds are insolubilized.

The condensation products obtained according to the invention are excellently suitable for use as textile assistants. They may be employed for instance as pigment binding agents, for instance in textile printing, to improve the tear resistance of paper when wet, as animalising agents for cellulose and synthetic fibers of all kinds, and to improve the fastness to wet processing of substantive dyestuffs. The quaternary compounds show similar properties.

It is worthy of note that the majority of the new condensation products do not precipitate with substantive dyestuffs and, therefore, may be used in a single bath process to improve the fastness of substantive dyestuffs to wet processing.

As described above the new condensation products can be insolubilized by self-linking reaction; they can also be insolubilized by addition of cross-linking agents, for instance those referred to in the United States Letters Patent No. 2,643,958. The following examples shall serve to further illustrate the invention, the parts being by weight.

Example 1

92 parts of epichlorohydrin (1 mol) are added at once to the aqueous solution of 79.2 parts of γ,γ-diaminodipropyl ether (0.6 mol) and 500 cc. of water and rapidly heated to 75° C. with stirring. After about 6 hours the viscosity has increased to 240 centipoises. The condensation reaction is interrupted by addition of 40 cc. of concentrated hydrochloric acid.

Instead of γ,γ'-diaminodipropyl ether, γ,γ'-diaminodipropyl sulfide, hexamethylenediamine or triethylenetetramine may be used in the reaction.

Example 2

92 parts of epichlorohydrin (1 mol) are introduced within 30 minutes while stirring into the 55° C. hot solution of 46 parts of dipropylenetriamine (0.35 mol) and 500 cc. of water. After 6 hours the viscosity has increased to about 500 cp. 650 cc. of 55° C. hot water are added and the dilute solution is condensed until it reaches a viscosity of about 600 cp.

Example 3

92 parts of epichlorohydrin (1 mol) are added within one hour while stirring into the solution of 48.3 parts of γ,γ'-diaminopropylmethylamine (0.33 mol) heated to 50° C. The solution is heated at this temperature until the viscosity has increased to 150 cp. By addition of 50 cc. of concentrated hydrochloric acid the pH value reached at the end of condensation drops from 8.4 to 2.5 whereafter the solution is practically stable.

Example 4

92 parts of epichlorohydrin (1 mol) are dropped within 1 hour into the 40° C. warm aqueous solution of 72.5 parts of γ,γ'-diaminopropylmethylamine (0.5 mol) and 500 cc. of water. By further stirring at this temperature the solution becomes slowly more viscous. After one hour the solution reaches a viscosity of 15 cp., and 150 cp. after 1¼ hours. The condensation is interrupted by addition of hydrochloric acid until the pH value is 2.5.

Example 5

The solution of 22.5 parts of diaminopropyltetramethylenediamine (0.11 mol), which is dissolved in 250 cc. of water, is added at once at room temperature to 46 parts of epichlorohydrin (0.5 mol) and heated rapidly to 55° C. The epichlorohydrin dissolves soon. After heating to 55° C. for about one hour the solution begins to become viscous.

After 2 hours the viscosity is about 3 cp.
After 3½ hours the viscosity is about 11 cp.
After 4½ hours the viscosity is about 23 cp.

Thereupon the solution is cooled to 30° C. and further stirred at this temperature.

After 5 hours the viscosity is about 61 cp.
After 5½ hours the viscosity is about 160 cp.
After 6 hours the viscosity is about 528 cp., etc.

After reaching the desired viscosity the condensation is interrupted by adding hydrochloric acid until the pH value amounts to 3–4.

Example 6

46 parts of epichlorohydrin (0.5 mol) are introduced with stirring into the 55° C. hot solution of 26 parts of dipropylenetriamine (0.2 mol) in 250 cc. of water and the solution is heated to 55° C. for another 2½ hours. The viscosity of the solution amounts to 10 cp. The solution is cooled to 20° C. and 118 parts of dimethylsulfate and sodium hydroxide solution are added within 30 minutes so that the solution is maintained at an alkaline pH value (9–10), which is indicated by phenolphthalein paper. After another 3 hours the solution is stirred at 50° C. for further 3 hours until the viscosity has increased to 270 cp. This solution contains about 15% of a high molecular weight base in the form of its quaternary salt. By evaporating to a smaller volume the solution gelatinizes. By addition of hydrochloric acid the viscous solution is adjusted to the pH value 3.5 whereby it is stabilized.

Example 7

46 parts of epichlorohydrin (0.5 mol) are introduced with stirring into the 55° C. hot solution of 37 parts of dipropylenetriamine (0.28 mol) and 250 cc. of n./1 hydrochloric acid. By addition of hydrochloric acid one third of the polyamine is converted into its salt. By stirring at this temperature for another 20 hours the viscosity slowly increases to 300 cp.

Example 8

23 parts of epichlorohydrin (0.25 mol), 24.9 parts of N-(1.6-hexanediamine)-3-pyrrolidone (0.125 mol) and 125 parts of water are heated with stirring on the water bath for 24 hours. The clear solution takes a viscosity of 120 cp. The condensation is interrupted by addition of an acid, e. g. hydrochloric or another mineral acid.

Example 9

46 parts of epichlorohydrin (0.5 mol) and 25 parts of bis-(γ-aminopropyl)-piperazine (0.125 mol) are heated on the water bath with stirring. After 1½ days the viscosity amounts to 29 cp., after 3½ days to 63 cp. and after 4½ days to 312 cp. The solution is stabilized at the desired viscosity by addition of an acid, e. g. hydrochloric acid.

We claim:

The process of stabilizing an aqueous solution of a polymeric, basic condensation product containing epoxy groups in the molecule obtained by reacting, at a pH of 7–9.5 and a temperature between 40 and 70° C., in water, at a total concentration of 5 to 40% by weight, 1 mol of epichlorhydrin with 0.3 mol of γ,γ′-diaminopropylmethylamine, which consists in reducing the pH value of the aqueous solution to about pH 2.5, by the addition of a mineral acid, the resulting solution of the condensate being stable indefinitely at room temperature but capable of being insolubilized on heating to about 100° C.

References Cited in the file of this patent

UNITED STATES PATENTS

| | | |
|---|---|---|
| 2,469,683 | Dudley et al. | May 10, 1949 |
| 2,479,480 | Dudley | Aug. 16, 1949 |
| 2,573,956 | Daniel et al. | Nov. 6, 1951 |

FOREIGN PATENTS

| | | |
|---|---|---|
| 771,836 | France | Oct. 18, 1934 |
| 731,030 | Germany | Dec. 24, 1942 |